U. REYNOLDS.
King Bolt.
No 54,410.
Patented May 1, 1866.
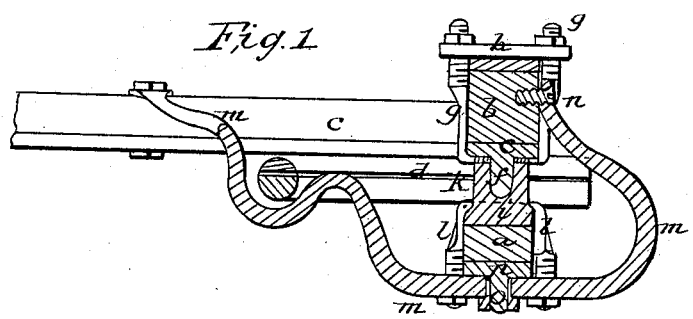
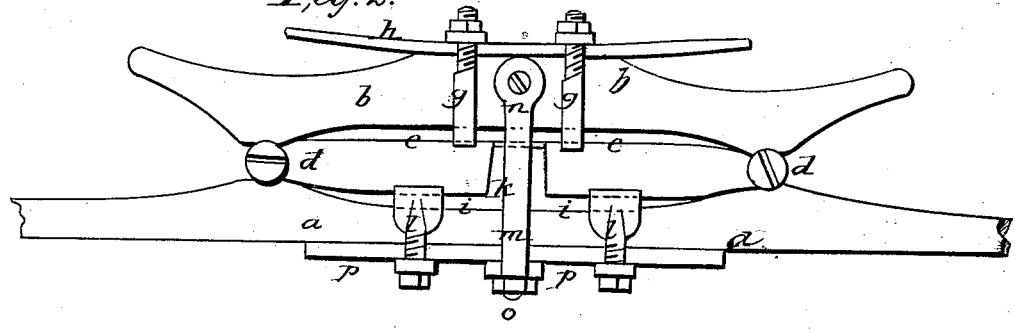
Witnesses:
Lemuel W. Serrell
Chas. H. Smith
Inventor:
U. Reynolds

UNITED STATES PATENT OFFICE.

UEL REYNOLDS, OF NEW YORK, N. Y.

IMPROVEMENT IN CARRIAGES.

Specification forming part of Letters Patent No. 54,410, dated May 1, 1866.

*To all whom it may concern:*

Be it known that I, UEL REYNOLDS, of the city and State of New York, have invented and made a certain new and useful Improvement in King-Bolts for Carriages, &c.; and I do hereby declare the following to be a full, clear, and exact description of the said invention, reference being had to the annexed drawings, making part of this specification, wherein—

Figure 1 is a section transversely of the axle, and showing my improved king-bolt; and Fig. 2 is a front view of the head-block and part of the axle.

Similar marks of reference denote the same parts.

Axles of carriages have heretofore usually been connected to the bolster or head-block by means of a king-bolt passing through both, and on which the axle swivels or turns diagonally to such bolster. The axle is injured by the insertion of said king-bolt, and the constant motion tends to wear the king-bolt and axle, and when the hole in the axle is worn large the axle itself has to be replaced. In other instances the king-bolt has been made upon the upper side of the clip around the axle and passed through a hole in the head-block, with a nut above.

The nature of my said invention consists in a socket upon a plate attached either to the head-block or to the axle, combined with a pivot projecting from a plate attached to the other of said parts, whereby the parts are connected and allowed to turn; but neither the head-block nor the axle are perforated; and I combine therewith a brace passing under the axle and receiving a bolt that projects from a plate, the ends of said brace being attached to the head-block at the front or top thereof and to the perch.

In the drawings, $a$ is the axle, either of wood or metal, or both. $b$ is the head-block or bolster; $c$, the perch; $d$, the fifth-wheels or arcs, all of which may be of any desired character, and form no part of my present invention.

$e$ is a plate below the head-block $b$, from the under side of which the pivot $f$ projects. This plate $e$ may be attached by the clips $g\ g$, which at the same time secure the lower portion of the carriage-spring $h$, or the pivot $f$ may be upon the center of a clip of sufficient size and strength applied to this part of the head-block.

$k$ is a socket attached to the upper side of the axle at the center thereof. I have shown it as formed upon the plate $i$—that is, attached by the clips $l\ l$; but said socket may be upon the upper part of a sufficiently strong clip applied to the center of the axle.

The pivot $f$ in the socket $k$ takes the place of the king-bolt and forms the center on which the axle can be turned, and it will be seen that the pivot and socket might be transposed in their position, the socket being attached to the head-block.

From the perch $c$, I provide a brace, $m$, extending below the axle $a$, and, passing up in front, is connected at $n$ to the head-block $b$, or said brace may be attached above the spring $h$ by the center bolt of said spring. This brace $m$ has a hole at the part directly below the pivot $f$, into which hole a bolt, $o$, passes. Said bolt $o$ projects from a plate, $p$, that sets against the under side of the axle and is secured thereto by the clips $l$, or in any other convenient manner. This brace $m$ prevents the pivot $f$ becoming disconnected from the socket $k$, and the bolt $o$ becomes a second pivot to prevent the axle twisting and tending to bend the pivot $f$. This bolt $o$ might be attached to or formed as a projection from the iron axle.

The brace $m$ may come up as a fork in front of the axle, so as to be connected to the head-block $b$ at two points, and I prefer to introduce a washer of india-rubber or other material around the pivot $f$, to keep out dust and prevent rattling or noise.

In case the head-block $b$ is sufficiently strong not to be injured by a bolt passing through it, the pivot $f$ might be prolonged through said head-block and retained firmly by a nut upon its upper end.

What I claim, and desire to secure by Letters Patent, is—

The pivot $f$ and socket $k$, applied, substantially as specified, between the axle and head-block, in combination with the brace $m$ and pivot $o$, substantially as and for the purposes specified.

In witness whereof I have hereunto set my signature this 22d day of February, 1866.

UEL REYNOLDS.

Witnesses:
LEMUEL W. SERRELL,
CHAS. H. SMITH.